US005128872A

United States Patent [19]

Malachowsky et al.

[11] Patent Number: 5,128,872

[45] Date of Patent: Jul. 7, 1992

[54] METHOD AND APPARATUS FOR DETERMINING LINE POSITIONS FOR DISPLAY AND MANIPULATION BY A COMPUTER SYSTEM

[75] Inventors: Chris Malachowsky, Santa Clara; Curtis Priem, Freemont, both of Calif.

[73] Assignee: Sun Microsystems, Inc., Mountain View, Calif.

[21] Appl. No.: 604,993

[22] Filed: Oct. 25, 1990

Related U.S. Application Data

[63] Continuation of Ser. No. 286,997, Dec. 20, 1988, abandoned.

[51] Int. Cl.[5] .............................................. G06F 15/62

[52] U.S. Cl. .................................................... 395/162

[58] Field of Search ................ 364/518, 521; 340/728, 340/729, 747

[56] References Cited

U.S. PATENT DOCUMENTS

| | | | |
|---|---|---|---|
| 4,538,144 | 8/1985 | Yamagami | 340/747 |
| 4,586,038 | 4/1986 | Sims et al. | 340/729 |
| 4,626,838 | 12/1986 | Tsujioka et al. | 340/747 X |
| 4,791,582 | 12/1988 | Ueda et al. | 340/729 X |
| 4,805,116 | 2/1989 | Liang et al. | 364/521 |
| 4,815,009 | 3/1989 | Blatin | 364/518 |
| 4,862,391 | 8/1989 | Ohhashi | 340/729 X |

*Primary Examiner*—Gary V. Harkcom
*Assistant Examiner*—Mark K. Zimmerman
*Attorney, Agent, or Firm*—Blakely Sokoloff Taylor & Zafman

[57] ABSTRACT

A circuit for determining the X values of each end of a series of horizontal scan lines connecting a pair of line segments each of which is defined by a pair of vertices, the horizontal scan lines defining an area to be rendered on a computer output device, comprising first and second circuit portions, each of said circuit portions including apparatus to determine the slope of a line segment, apparatus depending on the slope for determining the beginning and ending X values for each line segment for each scan line in the area to be rendered, apparatus for causing the two circuit portions to begin operation at the same scan line, and apparatus for changing the Y value for each circuit portion to the Y value of the next adjacent scan line at the same time.

5 Claims, 4 Drawing Sheets

X Major
Delta X = 4
Delta Y = 1
Initial E = 2

| CYCLE | X | Y | INITIAL E | INTER-MEDIATE E | FINAL E |
|---|---|---|---|---|---|
| n | 0 | 5 | 2 | -- | 1 |
| n+1 | 1 | 5 | 1 | 0 | 4 |
| n+2 | 2 | 6 | 4 | -- | 3 |
| n+3 | 3 | 6 | 3 | -- | 2 |
| n+4 | 4 | 6 | 2 | | |

METHOD AND APPARATUS FOR DETERMINING LINE POSITIONS FOR DISPLAY AND MANIPULATION BY A COMPUTER SYSTEM

This is a continuation of application Ser. No. 07/286,997, filed Dec. 20, 1988, now abandoned.

BACKGROUND OF THE INVENTION

1. Field of the Invention

This invention relates to computer systems and, more particularly, to circuitry for determining the position of individual points of a scan line which is to be displayed on the output display of a computer system.

2. History of the Prior Art

A major problem in utilizing computers to provide graphic displays is that for a single frame of graphical material to be presented on a cathode ray tube (CRT), it is usually necessary to store an indication of the information which is to be displayed for each position (pixel) of the cathode ray tube. With large and detailed displays, the number of pixels on the cathode ray tube may be approximately one thousand or greater in a horizontal direction and a like number in the vertical direction giving a total of approximately one million or more pixels about which information is to be stored. In a preferred system which is capable of providing a number of different colors on the cathrode ray tube, each of these pixels contains eight bits of digital information specifying the particular color output. Consequently, approximately eight million bits of information needs to be stored for each frame to be presented at the output.

Not only does color information have to be provided for each pixel for each frame of the display, but in generating graphic displays, the usual method of determining the shapes of figures requires that various algorithms be applied to the data to shape those figures. If this information is handled by the software of the system, computing the positions of each point to be displayed and determining the data to be displayed at that point slows the operation of the system to a point where functions such as animation are essentially impossible. For example, in order to present a polygon on the output display, it is necessary to determine each end on each horizontal line which makes up the polygon because the information is furnished to the display by scan lines. In prior art systems, this determination of the ends of each line to be scanned to the output display required the use of software run by the central processing unit (CPU) to evaluate the end values for each scan line of each graphical shape to be presented. Such arrangements increase the time taken to present the graphics to a point were appreciable slowing of the display occurs.

For this reason, various systems utilizing hardware to speed the operation have been suggested. One method for speeding the operation uses two output frame buffers and loads one buffer while the other is being scanned to the display. Such a system significantly speeds the operation but requires essentially twice as much memory to accomplish the storage.

It is, therefore, an object of the present invention to speed the operation of computer systems.

It is another object of the present invention to provide circuitry for handling in hardware the manipulations of graphical material which have in the usual case been handled by the software of the computer system.

It is an additional object of the present invention to provide circuitry for determining the X and Y coordinates of the ends of lines to be scanned to the output display.

SUMMARY OF THE INVENTION

These and other objects of the present invention are realized in a new output display system which utilizes a unique philosophy of graphic figure presentation whereby high speed graphics may be provided using only a single output display buffer.

In order to allow the use of hardware to implement the presentation of graphics, it has been found that the information presented to the hardware will be processed more rapidly if it is of essentially the same nature no matter what the shape is which is to be drawn on the display. The system is based on a definition of a graphical figure (shape) which considers the shape to be composed of a number of subportions each of which are quadrilaterals. Circuitry is provided for rapidly displaying quadrilateral images by handling only information regarding the four vertices of those quadrilaterals. All of these quadrilaterals may be handled in the same manner by the graphics presentation hardware and recombined on the display to present the desired shape.

The system breaks the quadrilaterals into subportions made up of pairs of line segments which subtend a trapezoidal area of scan lines to be presented on the output display. The X and Y coordinates of the two ends of each scan line in each trapezoid are then determined. This invention relates to circuitry which determines at the same time both ends of each scan line contained within a quadrilateral figure to be displayed at the output.

The system and the circuitry of this invention are devised to select the optimum manner of decomposing a shape so that the operation proceeds at its most rapid. For example, if a shape to be decomposed lies only partially within a clip window and either partially above or below the clip window, the operation will proceed more rapidly if the portion outside the clip window need not be processed. This may be accomplished if the decomposition may proceed from either the top down or the bottom up. Furthermore, random access memory used in computer systems is usually divided into groups referred to as pages; and accessing memory within a page takes less time than going from a first address in one page to a second address in another page (crossing a page boundary). If the operation proceeds from the bottom up, fewer page boundaries in memory need to be crossed if the processing of a given scan line proceeds from right to left rather than from left to right as in the normal case. The crossing of fewer page boundaries also allows more rapid operation.

The decomposition and scan line processing provided by the system and by the operation of this invention take place either from left to right or right to left and from the top down or from the bottom up. The circuitry is also able to determine the start and stop points of each scan line even though the figure is comprises of line segments which cross one another. The ability of the circuitry of this invention to provide such rectilinear coordinates allows the rapid transfers of graphic information to an output display.

These and other objects and features of the invention will become apparent to those skilled in the art by reference to the following detailed description taken together with the several figures of the drawing in which like elements have been referred to by like designations throughout the several views.

NOTATION AND NOMENCLATURE

Figure 1:
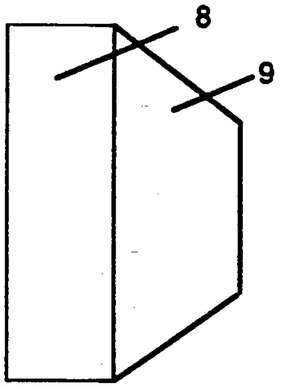
FIG. 1 is a representation of a graphical shape divided into two quadrilaterals which when individually displayed on a computer output device provide the complete original shape.
Figure 2A:
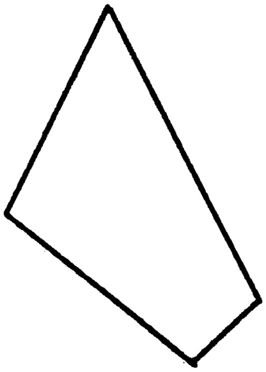
FIG. 2(*a*)-(*d*) is an illustration of a single quadrilateral shape decomposed into line segments.
Figure 2C:
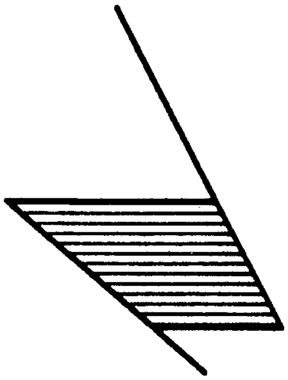
Figure 2B:
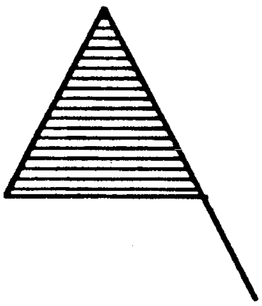
Figure 2D:
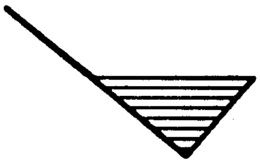

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other appparatus. In particular, various general purpose machines may be used with programs written in accordance with the teachings herein, or it may prove more convenient to construct more specialized apparatus to perform the required method steps. The required structure for a variety of these machines will appear from the description given below.

DESCRIPTION OF THE PREFERRED EMBODIMENT

In designing computer systems, it has become apparent that the display of graphic images substantially slows the operation of most machines. This occurs because the amount of information that the computer must deal with for each frame to be presented on the output display is very large and because the manipulation of that information in order to present the graphics image requires inordinate use of the central processing unit (CPU).

This is especially true in a system which utilizes an interface including multiple "windows" for its output display. In such a system, more than one program at a time is placed in portions of memory which are available for instant call. The text and graphics output of each such program is made to appear on the output display in a particular set of defined boundaries called a window or a clip window. Each window may overlap other windows with the "front window" constituting the current work file. Usually, the computer operator manipulates the program in only one window at a time but may switch rapidly to a program in another window to work with that program. In general, windows require substantially more memory and time to manipulate than do non-window operations.

The system of which this invention is a part speeds the display of computer graphics by handling most of the operations in hardware so that the information is available instantaneously. In order to allow the use of hardware to implement the presentation of graphics, the system breaks the graphics images to be presented on the display into quadrilaterals all of which may be handled in the same manner by the hardware. The system takes these quadrilaterals and further breaks them into line segments which subtend the same scan lines to be presented on the output display, the scan lines forming, in effect, a trapezoid. The X and Y coordinates of the two ends of each scan line are then determined by the circuitry of this invention. The system takes those rectilinear coordinates and translates them into serial scan lines which may be stored in a frame buffer and displayed on an output display.

FIG. 1 is a representation of a graphical shape divided into two quadrilaterals 8 and 9 which when individually displayed on a computer output device provide the complete original shape. Although the shape shown in FIG. 1 is simple, it will be apparent to those skilled in the art that shapes of essentially infinite complication may be represented if a sufficiently large number of small individual quadrilaterals are chosen. In fact, the system of the present invention has been utilized to represent three dimensional animated shapes of a very complicated nature.

Figure 3:
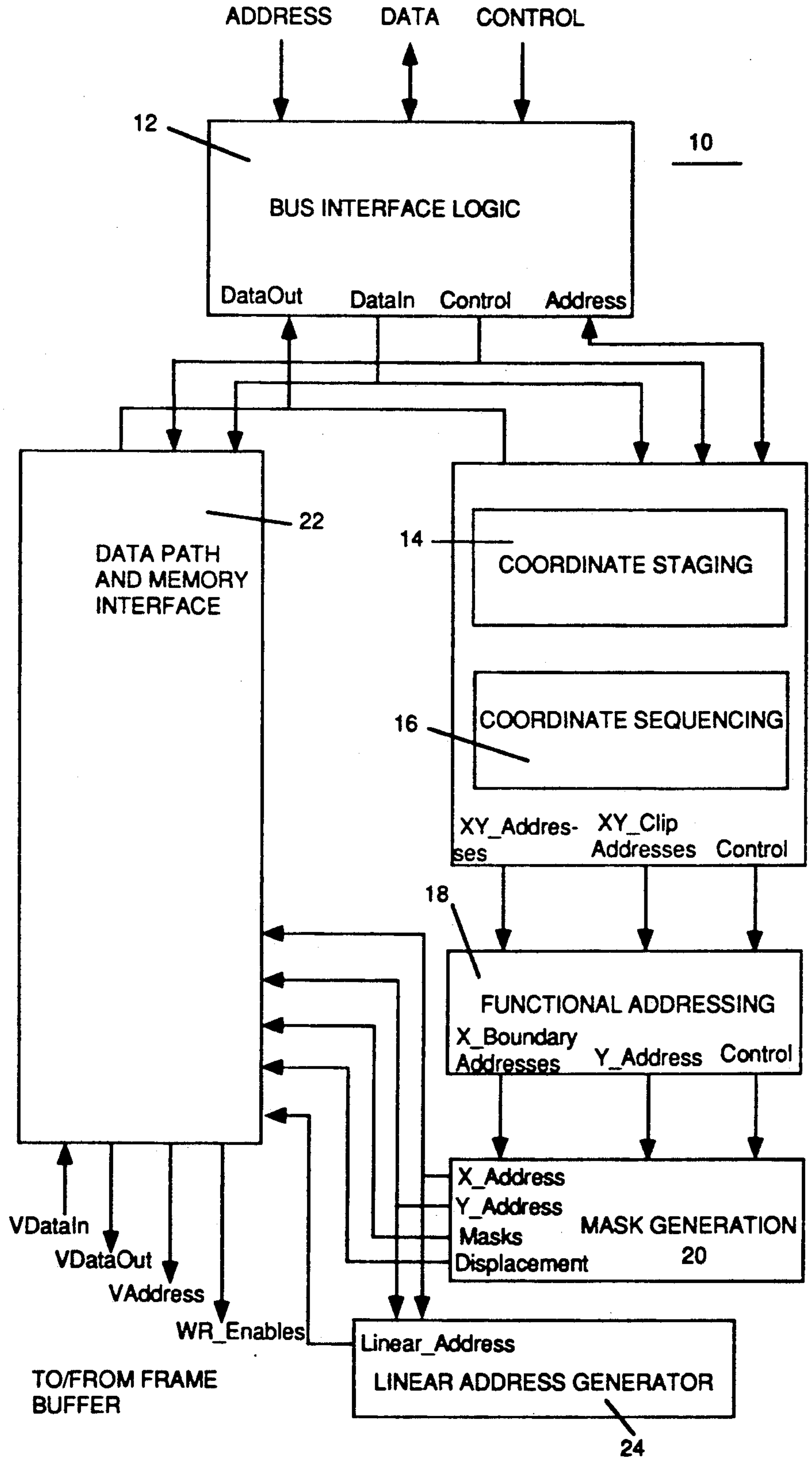
FIG. 3 is a block diagram illustrating a graphical output system for a computer constructed in accordance with the invention.

FIg. 3 illustrates in block diagram form a graphical output system 10 constructed in accordance with the invention which may be used with a general purpose computer system. The system 10 includes bus interface logic 12 which receives information regarding the desired graphical shape from the central processing unit of the computer system (not shown in the figures). The bus interface logic 12 receives information on an address line which designates the particular portion of the system 10 to which the input is to be transferred. The bus interface logic 12 receives the actual data such as the color description on an input data line. The bus interface logic 12 also receives a control signal designating the manner in which the information is to be treated on a control line.

When constructing graphical representations from quadrilaterals in accordance with the present invention, the input information includes the coordinates of the rectangular area which defines the particular window in which the displayed information is to appear, the coordinates (vertices) of the quadrilateral, and the color data regarding each quadrilateral. The color data which is to be presented at the display of the quadrilateral is stored in a data path and memory interface stage 22. The vertices of the quadrilateral and the clip window information are stored in coordinate staging circuitry 14 which includes hardware that provides comparisons of the incoming information by means well known to the prior art such as registers and gating circuits.

The comparisons made include the comparison of each X value of each vertex to the X value of each of the other vertices, the comparison of each Y value of each vertex to the Y value of each of the other vertices, and the comparison of each of the X and Y values of the vertices to X and Y values of the edges of the clip window in which the information is the be presented. Since this is accomplished by hardware, the information is immediately available for use by the system 10 without loss of any system clock time.

The information regarding the vertices of the quadrilateral and the clip window available at the coordinate staging circuitry 14 is presented to a coordinate sequencing stage 16 at which the quadrilateral is decomposed into a series of subportions each of which comprises two line segments of the original quadrilateral. Each of these subportions is chosen such that the line segments define an area of the quadrilateral which may be drawn by a series of parallel horizontal scan lines, each having an X beginning value lying on one of the line segments and an X ending value lying on the other. In essence, the two line segments define a trapezoid including as many Y (horizontal) scan lines as is possible in view of the shape of the quadrilateral. When all of the scan lines of all of the subportions are rendered on the display, the quadrilateral is defined in total.

FIG. 2(*a*)-(*d*) illustrates a single quadrilateral divided into subportions in accordance with this invention. The quadrilateral which is decomposed is shown in FIG. 2(*a*), and the subportions thereof are illustrated in FIGS. 2(*b*)-(*d*). As may be seen in FIG. 2, each subportion includes, when presented on an output display, a series of horizontal scan lines which begin at one line segment defining the quadrilateral and end at another line segment. The scan lines for each subportion of the quadrilateral represent a trapezoidal portion of the original quadrilateral. When these horizontal lines of all of the trapezoidal subportions are scanned to the frame buffer for presentation on the output display, the entire quadrilateral shape is reconstituted on the display.

Referring again to FIG. 3, after the quadrilaterals have been decomposed into subportions, the individual Y scan lines have their beginning and ending X values determined at a functional addressing stage 18. In the preferred embodiment of the invention, this is accomplished by the use of circuitry which determines the particular pixels constituting the X values at the beginning and end of each scan line within the decomposed subportions of the quadrilateral. This functional addressing stage 18 also accomplishes a portion of the clipping necessary to fit the particular quadrilaterals to the clip windows, and then transfers the signals to a mask generation stage 20 which arranges the information into sixteen pixel portions that designate the beginning and end of each scan line and are used for addressing the data path and memory interface stage 22.

The mask generation signals are also furnished to a linear address generator 24 which translates the rectilinear addresses provided by the mask generation stage 20 into signals for linearly addressing the frame buffer for the output display. At this point, the color data relating to the quadrilateral to be displayed has been held in memory at the stage 22 is transferred to the output display (frame) buffer.

Various portions of the system above described are more particularly described in the following patent applications all of which were filed on the filing date of this patent application and are assigned to the assignee hereof:

Ser. No. 07/297,475, filed Jan. 13, 1989, HARDWARE IMPLEMENTATION OF CLIPPING AND INTER-COORDINATE COMPARISON LOGIC, Malachowsky and Priem; Ser. No. 07/297,604, filed Jan. 13, 1989, APPARATUS AND METHOD FOR PROCESSING GRAPHICAL INFORMATION TO MINIMIZE PAGE CROSSINGS AND ELIMINATE PROCESSING OF INFORMATION OUTSIDE A PREDETERMINED CLIP, Malachowsky and Priem; Ser. No. 07/297,093, filed Jan. 13, 1989, APPARATUS AND METHOD FOR USING A TEST WINDOW IN A GRAPHICS SUBSYSTEM WHICH INCORPORATE HARDWARE TO PERFORM CLIPPING OF IMAGES, Malachowsky and Priem; Ser. No. 07/297,590, filed Jan. 13, 1989, APPARATUS AND METHOD FOR LOADING COORDINATE REGISTERS FOR USE WITH A GRAPHICS SUBSYSTEM UTILIZING AN INDEX REGISTER, Malachowsky and Priem; Ser. No. 07/287,392, filed Dec. 20, 1988, METHOD AND APPARATUS FOR SORTING LINE SEGMENTS FOR DISPLAY AND MANIPULATION BY A COMPUTER SYSTEM, Malachowsky and Priem; Ser. No. 07/287,493, filed Dec. 20, 1988, METHOD AND APPARATUS FOR TRANSLATING RECTILINEAR INFORMATION INTO SCAN LINE INFORMATION FOR DISPLAY BY A COMPUTER SYSTEM, Malachowsky and Priem; and Ser. No. 07/287,128, filed Dec. 20, 1988, METHOD AND APPARATUS FOR DECOMPOSING A QUADRILATERAL FIGURE FOR DISPLAY AND MANIPULATION BY A COMPUTER SYSTEM, C. Malachowsky.

The invention considered by this specification relates to the apparatus and method for determining the ends of each horizontal line in each trapezoidal subportion of the quadrilateral which is ultimately to be provided to the output display as a scan line. Although this invention is described in terms of the graphics system illustrated in FIG. 3, it will be realized by those skilled in the art that it will have broad application in other systems for providing graphical output displays for computer systems.

The circuitry of this invention receives from the circuitry which decomposes each quadrilateral into subportions input signals representing the pairs of line segments which subtend a series of common horizontal lines which are to be displayed at the output display of the computer system with which the graphics system is associated. These signals are furnished to the circuitry which provides these signals is described in copending patent application Ser. No. 07/287,128, entitled METHOD AND APPARATUS FOR DECOMPOSING A QUADRILATERAL FIGURE FOR DISPLAY AND MANIPULATION BY A COMPUTER SYSTEM, C. Malachowsky, filed on even date herewith.

Since the line position information furnished to the circuitry of this invention includes only the vertices of the line segments defining the particular subportions of the quadrilateral while the output display handles information on a scan line basis, it is necessary to determine the end points of each of the horizontal Y scan lines subtended by the line segments so that the scan lines may be presented on the output display to complete the quadrilateral of interest.

When drawing a straight line on an output display such as a cathode ray tube, the line is defined by a series of pixels on adjacent scan lines. If the line to be drawn is horizontal, then a single scan line on the display is sufficient to draw the line if the address of the starting and ending pixels are furnished. If the line is vertical, then a single pixel from each of a number of adjacent scan lines must be written to the display. Lines between horizontal and vertical vary in the number of pixels per scan line depending on the slope of the line. If the line has a small slope, then a number of adjacent pixels are drawn on each of a number of adjacent scan lines, continuing until the line is completed. If the beginning and ending X values of each series of adjacent pixels on each scan line are known, then the intervening pixels may be filled on the display and the line completed.

It is necessary to know the position on each scan line of each of the line segments which define the sides of the trapezoids to be scanned to the display in order to draw those trapezoids. This is true in order to begin and end each scan line and to clip the scan lines to fit a clip window. If clipping occurs across a line segment, a method must be devised for determining the portion of each line segment which is to be drawn. The philosophy of the circuitry of this invention is to determine those beginning and end points on each scan line.

The circuitry of this invention includes two similar portions so that it may handle each of the two line segments defining a subportion at the same time. Each portion of the circuitry begins, initially, at one vertex of a line segment, computes the slope of that line segment, determines from this computation whether the X or the Y value of the segment increases at a greater rate, determines and stores an initial error value which is to be decremented based on the slope, and begins plotting values from a first vertex. The error value is selected to measure the distance, perpendicular to the axis of greatest movement, between the exact path of the line segment and the actual pixels generated. If the value of X changes faster than Y, then with each step X is incremented (or decremented) by one pixel while the change in Y is substracted from the error value until the error value reaches zero or less. In this manner, the X value at which the Y value is to be incremented (or decremented) is determined. This X value is stored as the end X value for the particular line segment, and the Y value is incremented (or decremented). The X value first encountered at the new Y value is stored as the beginning X value for the new scan line associated with the new Y value. The operation continues in this manner, storing for each Y value the first and last X value encountered, until the end vertex for the line segment is reached.

Since two circuits are operating in the same manner to process the two line segments of each subportion of a quadrilateral at the same time, the portion of the circuitry handling the first line segment ready to change its Y level, when ready to do so, waits for the circuitry handling the other line segment to reach the point of change in its Y value. When this occurs, the X values for a complete scan line have been defined and may be processed; consequently, both circuits advance to the next Y value at the same time. The processing of the two beginning and two ending X values identified for each of the scan lines involves determinng the leftmost (minimum) and the rightmost (maximum) of the stored X values to be delivered to the mask generation circuitry 20 shown in FIG. 3.

In order to rapidly process each quadrilateral, when the end of a line segment of a subportion is reached, the circuitry loads the next line segment to be processed. As is often the case, one line segment terminates before the other. In such a case, the non-terminating line segment information need not be reloaded; and substantial time is saved.

The circuitry continues processing the line segments of the quadrilateral until the figure is completed. At each step, the values generated are passed to circuitry for sorting the values to determine the actual beginning and ending values of the scan lines in view of the direction of operation of the circuitry of this invention and the application of the clip window information. This sorting operation takes place because, as pointed out above, the system and the circuitry of this invention are devised to select the optimum manner of decomposing a shape so that the operation proceeds at its most rapid. For example, If a shape to be decomposed lies only partially within a clip window and either partially above or below that clip window, the operation proceeds more rapidly if the portion outside the clip window need not be processed. This may be accomplished if the decomposition may proceed from either the top down or the bottom up. Furthermore, if the operation proceeds from the bottom up, fewer page boundaries in memory need to be crossed if the operation proceeds from right to left rather than from left to right as in the normal case. The crossing of fewer page boundaries also allows more rapid operation.

The following is an algorithm in pseudocode similar to the C programming language for implementing the operation of this invention. The algorithm represents a modified version of the well known Bresenham Algorithm although it should be apparent to those skilled in the art that numerous other scan conversion algorithms exist and could be readily implemented in practicing the invention. In this algorithm, DeltaX means the change in X from one vertex to another;

DeltaY means the change in Y from one vertex to another;

X is initially set to the value of the beginning vertex;

Y is initially set to the value of the beginning vertex;

Xterm is the X value of the ending vertex;

Yterm is the Y value of the ending vertex;

abs() returns the absolute value of its arguments; and major axis refers to either X or Y depending on whether DeltaX is greater than DeltaY or not.

Initialization:

DeltaX = abs (X-Xterm)

DeltaY=abs (Y-Yterm)
major axis=((DeltaY-DeltaX)>=0)?Y:X
slope=((X-Xterm)>=0)?Y:X
up=((Y-Yterm)>=0)?0:1
E=:(Delta (major axis)>>1)
cb=Delta (major axis)[0]/*least significant bit*/ t,0170

Figures 4A, 4B:
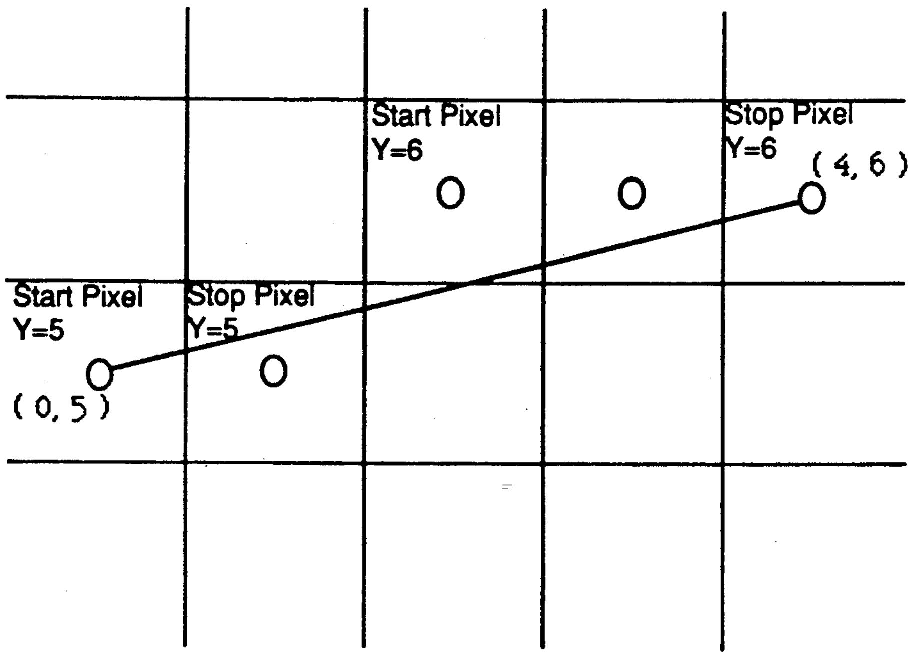
FIG. 4 (*a*) and (*b*) is an illustration of the operation of one portion of the circuitry of the invention.

FIG. 4(*a*) and (*b*) illustrates the operation of a portion of the circuitry of this invention just described for handling one line segment. In FIG. 4(*a*), a line segment starting at vertex (0,5) and ending at vertex (4,6) is illustrated. In implementing the invention, the circuitry first determines the change in X between the two vertices of the line segment, the change in Y between the vertices, and from this computes the slope of the line segment, determines the major axis (the value with the greatest change), and sets the error term to be equal to one-half of the value of the change in X. This half value is selected to balance the pixels defined by the circuitry for the line segment to give a more symmetric appearance. Given these values, the plot commences with the vertex value of X being stored as the value of the first X on the scan line for the line segment. then the circuitry decrements the error by the value of the change in Y and applies two test conditions: is the error term now less than zero. or is the drawing direction up and the error equal to zero.

If neither of these conditions have occurred, the operation continues until the value of the error term is brought to a point where the test condition indicates a true state, i.e., zero or less. At this point, the value of the X term is stored as the last X value for that scan line (Y value) for that line segment. The operation continues to the next Y value, storing the first X value after the increment as the beginning X value for the scan line and adding back the value of the change in X to the error term. The operation continues along the scan line, increasing the X values and reducing the error term until the error term falls to zero or less. Again, the X value at this point is stored as the last X value for the scan line, the change in X is added back to the error term, and the operation moves to the next Y value.

The operation continues until the X value is determined to be equal to the X termination value for the line segment; at this point the entire line segment is defined, and the circuit can be initialized for a new line segment. It should be noted that although each of the portions of the circuit operate independently to process one of the two lines segments, as each portion of the circuitry handling a line segment ends a particular scan line, it tests whether the other line segment has been completely defined for that scan line. If it has not, then the circuitry waits for the other line segment to finish that scan line so that the two may progress together and the complete definition of each scan line may be transferred to the circuitry which follows at one time.

Figure 5:
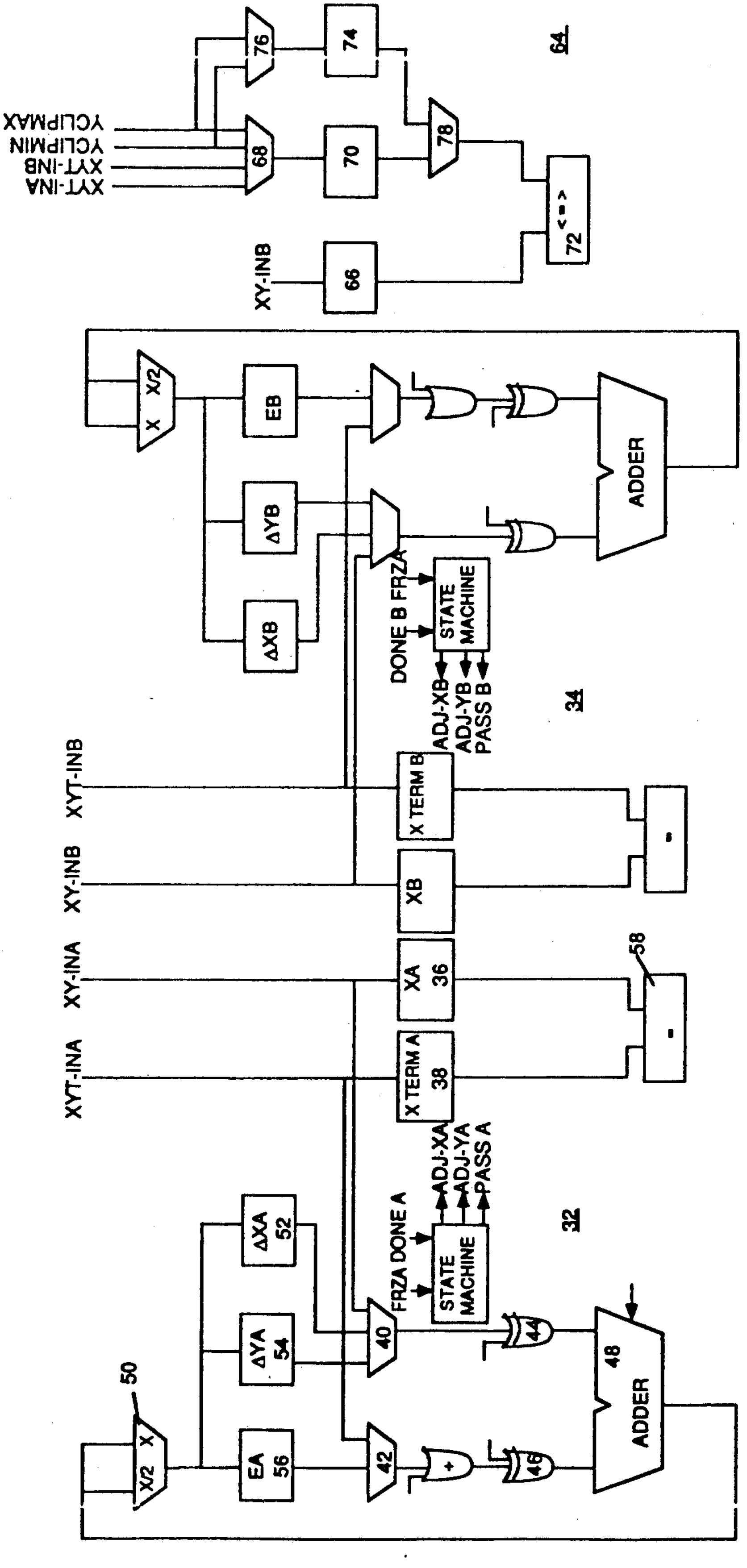
FIG. 5 is a circuit diagram illustrating one method of implementing the invention.

FIG. 5 illustrates one circuit 30 which is a preferred embodiment for implementing the invention. The circuit 30 includes a pair of essentially similar portions 32 and 34, each of which handles one of the two line segments. Only the portion 32 will be discussed because of this similarity. When determining the end values of scan lines, the circuitry is first initialized for each segment. To accomplish this, on a first clock cycle, the portion 32 receives input values representing the X values of the beginning and ending of the first line segment (the A line segment). These values are stored in registers 36 and 38, respectively, and are transferred to multiplexors 40 and 42. The X values are passed by the multiplexors 40 and 42 to exclusive OR(XOR) gates 44 and 46.

These XOR gates 44 and 46 also receive inputs (zero to one) which allow the X value to be passed through or complemented so that values may be either added or substracted by an adder 48. If a zero is furnished the exclusive OR gate 44, for example, the value on the other input is simply passed through to the adder 48 while if a one is furnished the gate 44, the input value is complemented so (as a binary number) it may be conveniently substracted. In order to determine the change in the X value from beginning to termination, the difference of the X terms is computed and furnished by a multiplexor 50 to a change-in-X register 52 for storage.

On the next clock cycle, the beginning and ending Y values of the A line segment are furnished the multiplexors 40 and 42; and, in a like manner, the change in Y is determined by the adder 48 and stored in both a change-in-Y register 54 and an error register 56.

The storage of the change in Y value in the error register 56 allows the determination of the major axis without the need for additional circuitry. This is accomplished by passing the values held in the registers 52 and 56 to the adder 48 while complementing one of them so that the larger of delta X or delta Y is determined. This larger value is then divided by two by shifting the value in the adder 48 right by one bit and placed in the error register by the multiplexor 50. This completes the initialization of the circuitry 32.

At the same time, the circuitry 34 is receiving the beginning and ending X and Y values and completing its initialization for the other one of the two line segments to be processed, the B line. Once initialization is completed, each of the circuits 32 and 34 begins processing the line segment information for the line segment it is handling. Considering only circuit 32, the current X value for line A is maintained by register 36. The value in register 36 is tested against the termination value of X stored in register 38 by a comparator 58. If the values are not equal, the multiplexers 40 and 42 transfer the error and Y change values via the exclusive OR gates 44 and 46 to the adder 48 so that the Y change is subtracted from the error. The reduced error value is stored in the error register 56, and the process continues until the error value goes to zero or less. The relation of the error to the zero value is tested by a state machine 60 which, when the test condition is satisfied, passes the present X value as the end value for this Y scan line, causes the Y value to be incremented (or decremented), and resets the error register by adding to the present error value a value equal to the value of the change in X.

As outlined above, when either the circuitry 32 or the circuitry 34 reaches the point where a Y value is to change in accordance with the value of the slope of the line segment, the circuit 32 and 34 first to reach the change value signals the state machine 60 and waits for the other of the two circuits 32 or 34 until that circuit is also ready to change Y value. When this occurs, the state machine provides signals for advancing each of the two circuits 32 and 34 to the next Y line. In this manner, each circuit 32 and 34 handles the same Y scan line at the same time and the values of both ends of a scan line may be passed at the same time to the circuitry which follows.

When the circuit 30 of FIG. 5 is processing a line segment to determine the X values of the horizontal line ends and the line segment is one with a slope greater than or equal to one, i.e., forty-five degrees or more, the circuitry operates in essentially the same manner. The X beginning and termination values of each line segment are first processed by each of the circuits 32 and 34 to determine a change in X value for each. The Y beginning and termination values of each line segment are next processed by each of the circuits to determine a change in Y value for each. The change in X value is then compared to the change in Y value for each of the two line segments, and the error set to one-half of the change in Y value for each line segment with a slope greater than one. The processing then proceeds as before, stepping through Y values initially, however, until a change occurs in X.

A circuit 64 is, in the meantime, handling the Y values. Circuit 64 includes a register 66 which initially receives and maintains the Y value, a multiplexer 68 which receives a number of signals including the Y termination value of each line segment and the Y clip minimum and maximum values, and a Y termination register 70. The values in the registers 66 and 70 are compared by a comparator 72 which is capable of determining whether one value is greater, less than, or equal to the other. This arrangement may be used to determine when a line segment has reached its termination point and also determine when the figure is within the clip window.

Also included in the circuit 64 is a Y clip register 74 which receives input values indicating the maximum or minimum Y clip value. These values indicate the position of the upper and lower boundaries of the clip window to which the quadrilateral is to be written. The clip register 74 is furnished one of these values by a multiplexer 76 which passes either the minimum or maximum Y value of the clip window depending on the direction the information is being written to the frame buffer.

There are certain cases in which a particular shape to be rendered may be clipped at both its top and bottom edges. The clipping at the beginning edge of the shape is determined by comparing the Y initial value in register 66 with the beginning clip value which is furnished to the register 74 by a multiplexer 76. If the information is being written down the screen, for example, the value furnished is the clip minimum Y value; if progressing in the other direction, the clip maximum Y value is furnished to the register. A multiplexer 78 furnishes the clip value to the comparator 72. The magnitude comparator 72 then provides a signal which inhibits rendering until the Y value is within the clip window.

The value of Y placed in the register 70 is the Y value of the last line to be drawn in the trapezoid or the appropriate Y clipping boundary depending on the value at which the entire figure is to terminate once the shape is within the clip window. This value (register 70) is furnished by the circuitry (multiplexor 78) to the comparator 72 which compares the current value of Y (register 66) with this termination value for Y.

In the case in which the shape extends beyond the clip window, the ending Y clip value is placed in the register 70 and compared in the comparator 72 to the actual Y value. In this manner, the ending value of the portion of the shape to be rendered may be determined. This is especially useful in the present invention which is capable of writing the information to the frame buffer in either up or down order (that is, in increasing or decreasing Y direction, respectively). This allows the scan conversion of the lines to proceed such that the visible (non-clipped) information is processed first in the operation followed by information which will be clipped. This latter information may be disregarded thereby substantially increasing the speed of operation.

Although the present invention has been described in terms of a preferred embodiment, it will be appreciated that various modifications and alterations might be made by those skilled in the art without departing from the spirit and scope of the invention. the invention should therefore be measured in terms of the claims which follow.

We claim:

1. In a computer graphic display system for rendering images on a graphic display device, said system comprising a central processing unit (CPU), memory, and input/out means comprising the graphics display device, said graphics display device comprising a matrix of pixels having a predetermined number of horizontal scan lines of pixels, said images displayed on the graphic display device by actuating certain of the pixels identified by pixel data, said pixel data comprising coordinate values which correspond to pixel locations in the matrix, said image comprising at least one quadrilateral having a right line segment and left line segment, each line segment having a first and second endpoint, the y coordinate values of the first endpoint for the right and left line segments being equal and the y coordinate values of the second endpoint for the right and left line segments being equal, the endpoints of the line segments defining the vertices of the quadrilateral, said pixel data representing the quadrilateral generated by determining the rightmost and leftmost pixel location of the quadrilateral for each scan line and generating pixel data for the rightmost pixel and leftmost pixel and each pixel located on the scan line between the rightmost and leftmost pixel, a circuit for simultaneously determining the rightmost pixel and leftmost pixel to be actuated on a scan line comprising:

- receiving means for receiving the X, Y coordinate values of the endpoints for the right line segment and left line segment and a Y increment value which is a value of one if the image is to be rendered in ascending scan line order and is a value of negative one if the image is to rendered in descending scan line order;
- a right sub-circuit and left sub-circuit, said right sub-circuit determining a rightmost pixel of the right line segment on a scan line and said left sub-circuit determining the left most pixel of the left line segment on the scan line, said right and left sub-circuits concurrently determining said rightmost and leftmost pixel for a scan line, each of said sub-circuits comprising;
  - a first subtracter means connected to the receiving means for determining the difference between the Y corrdinate value of the endpoints of the line segment and outputing the absolute value of the difference as the ΔY value;
  - a second subtracter means connected to the receiving means for determining the difference between the X coordinate value of the endpoints of the line segment and outputing the absolute value of the difference as the ΔX value;
  - major axis determining means connected to the first subtracter and second subtracter for determining the major axis to be the X axis if the ΔX value is greater than or equal to the ΔY value, or the y axis if the ΔY value is greater than the ΔX value;

X increment determining means connected to the first subtracter and second subtracter for determining the X increment from the slope of the line segment, said slope being equal to $\Delta Y/\Delta X$, said X increment value determined to be a value of one if the slope of the line segment is greater than zero and determined to be a value of negative one if the slope of the line segment is less than zero;

a first register connected to the receiving means for storing the current X value, said current X value initialized to be the X coordinate value of a first endpoint of the line segment;

a second register connected to the receiving means for storing the X termination value, said X termination value initialized to be the X coordinate value of a second endpoint of the line segment;

a third register connected to the major axis determining means and first and second subtracter means for storing an error value, said error value initialized to be equal to the one-half the corresponding $\Delta$ value for the major axis;

a fourth register connected to the first substracter means for storing the $\Delta Y$ value;

a fifth register connected to the receiving means for storing the current Y value, said current Y value initialized to be the Y coordinate value of the first endpoint, the Y coordinate value of the said first endpoint of the right line segment being equal to the Y coordinate value of the first endpoint of the left line segment;

a sixth register connected to the second subtracter means for storing the $\Delta X$ value;

a first comparator connected to the first and second registers for comparing the current X value and the X termination value, said first comparator outputing a first control signal if the current X value is not equal to the X termination value indicating that processing is complete;

a first register control means having a first input connected to the first comparator and a first and second output connected to the third and fourth registers to cause the error value from the third register to be output and the $\Delta Y$ value from the fourth register to be output when the first control signal is received from the first comparator;

an inverter connected to the output of the fourth register to receive the $\Delta Y$ value and invert the $\Delta Y$ value;

a adder, comprising a first input connected to the output of the third register to receive the error value and a second input connected to the output of the inverter to receive the inverted $\Delta Y$ value, to generate the sum of the inverted $\Delta Y$ value and the error value, said added further comprising an output connected to the third register to update the error value located in the third register to be the difference between $\Delta Y$ value and the error value;

a second comparator connected to a second output of the third register to receive the updated error value, said second comparator outputting through a first output a second control signal if said error value is less than or equal to zero and outputing through a second output a third control signal if said error value is greater than zero;

a second register control means comprising, an input connected to the second comparator, a first output connected to the first register for incrementing the current X value by the X increment value upon receipt of the third control signal, and a second output connected to first register, third register and the sixth register for, upon receipt of the second control signal, updating the error value in the third register to be equal to the sum of the error value and corresponding $\Delta$ value of the major axis, outputing the current X value from the circuit, and incrementing the current X value by the X increment value and incrementing the current Y value by the Y increment value for determination of the X value to be output with respect to the next scan line located at the incremented Y value;

a circuit output control means connected to the right sub-circuit and left sub-circuit and a means for generating pixel data for the scan line to be output to the frame buffer, said pixel data identifying the pixels to be actuated on the scan line, said circuit output control means controlling the output of the current X value to be delayed until both sub-circuits are ready to output an X value from the circuit, the X value output by the right sub-circuit being the X coordinate location of the rightmost pixel to be actuated on the current scan line and the X value output by the left sub-circuit being the X coordinate location of the leftmost pixel to be actuated on the current scan line;

whereby the coordinate values of the leftmost and rightmost pixels are output simultaneously to the means for generating pixel data which generates the pixel data on the current scan line to be actuated between the rightmost pixel and leftmost pixel and outputs the pixel data immediately to the frame buffer to actuate the pixels identified by the pixel data on the display device.

2. The apparatus as set forth in claim 1, wherein the first register control means comprises a first multiplexor connected to the third register and a second multiplexor connected to the fourth register whereby the first multiplexor passes the output of the third register and the second multiplexor passes the output of the fourth register upon receipt of the first control signal.

3. The apparatus as set forth in claim 1, wherein the circuit output control means comprises a state machine.

4. In a computer graphic display system for rendering images on a display device, said apparatus comprising a central processing unit (CPU), memory, and input/out means comprising a graphics display device, said graphics display device comprising a matrix of pixels comprising a predetermined number of horizontal scan lines of pixels, said images displayed on the display device by actuating certain of the pixels identified by pixel data comprising coordinate values which correspond to pixel locations in the matrix, said image comprising at least one quadrilateral having a right line segment and left line segment, the endpoints of the line segments defining the vertices of the quadrilateral, said pixel data generated by determining the rightmost and leftmost pixel location of the quadrilateral for each scan line and generating pixel data for the rightmost pixel and leftmost pixel and each pixel located on the scan line between the rightmost and leftmost pixel, a circuit for simultaneously determining the rightmost pixel and leftmost pixel to be actuated on a scan line,:

receiving means for receiving the X,Y coordinate values of the endpoints for the right line segment and left line segment and a Y increment value which is a value of 1 if the image is to be rendered in ascending scan line order and is a value of −1if the image is to rendered in descending scan line order;

a right sub-circuit and left sub-circuit for, said right sub-circuit determining the rightmost pixel of a scan line and said left sub-circuit determining the left most pixel of a scan line, said right and left sub-circuits concurrently determining said rightmost and leftmost pixel for a scan line, each of said sub-circuits comprising;

a first subtracter means connected to the receiving means for determining the difference between the Y coordinate value of the endpoints of the line segment and outputing the absolute of the difference as the ΔY value;

a second subtracter means connected to the receiving means for determining the difference between X coordinate value of the endpoints of the line segment and outputing the absolute value of the difference as the ΔX value;

major axis determining means connected to the first subtracter and second subtracter for determining the major axis to be the X axis if the ΔX value is greater than or equal to the ΔY value, or the y axis if the ΔY value is greater than the ΔX value;

X increment determining means connected to the first subtracter and second subtracter for determining the X increment from the slope of the line segment which is equal to ΔY/ΔX, said X increment value is set to be one if the slope of the line segment is greater than zero and to negative one if the slope of the line segment is less than zero;

a first register connected to the receiving means for storing the current X value, said current X value initialized to be the X coordinate value of a first endpoint;

a second register connected to the receiving means for storing the X termination value, said X termination value initialized to be the X coordinate value of a second endpoint;

a third register connected to the major axis determining means for storing an error value, said error value initialized to be equal to the one-half the corresponding Δ value for the major axis;

a fourth register connected to the first subtracter means for storing the ΔY value;

a fifth register connected to the receiving means for storing the current Y value, said current Y value initialized to be the Y coordinate value of the first endpoint;

a sixth register connected to the second subtracter means for storing the ΔX value;

a state machine connected to first register, second register, third register, fourth register, fifth register and sixth register for controlling the input and output of data from the registers; said state machine, comparing a current X value and X termination value respectively located in the first and second registers to determine if processing is complete, wherein processing is complete if the current X value equals the X termination value;

updating the error value to be the sum of the error value read from the third register and the Δ value of the minor axis retrieved from fourth register if the Y axis is the minor axis of the sixth register if the X axis is the minor axis;

incrementing the current X value in the first register if the updated error value is greater than zero;

determining the current X value as the output of the sub-circuit for the current scan line, incrementing the current X value by the X increment, incrementing the current Y value by the Y increment and readjusting the error value to be equal to the sum of the updated error value and the Δ value of the major axis, if the updated error value is less than or equal to zero, outputing the current X value that is the output of the sub-circuit for the current scan line when both sub-circuits have determined X values to be output, the X value output by the right sub-circuit being the X coordinate location of the rightmost pixel for the current scan line and the X value output by the left sub-circuit being the X coordinate location of the leftmost pixel for the current scan line;

whereby the coordinate values of the leftmost and rightmost pixels are output simultaneously and the means for generating pixel data can generate the pixel data which is output to the frame buffer to immediately render the scan line of pixel data on the display device.

5. In a computer graphic display system for rendering images on a graphic display device, said system comprising a central processing unit (CPU), memory, and input/out means comprising the graphics display device, said graphics display device comprising a matrix of pixels having a predetermined number of horizontal scan lines of pixels, said images displayed on the graphic display device by actuating certain of the pixels identified by pixel data, said pixel data comprising coordinate values which correspond to pixel locations in the matrix, said image comprising at least one quadrilateral having a right line segment and left line segment, the endpoints of the line segments defining the vertices of the quadrilateral, said pixel data representing the quadrilateral generated by determining the rightmost and leftmost pixel location of the quadrilateral for each scan line and generating pixel data for the rightmost pixel and leftmost pixel and each pixel located on the scan line between the rightmost and leftmost pixel, a circuit for simultaneously determining the rightmost pixel and leftmost pixel to be actuated on a scan line comprising:

receiving means for receiving X,Y coordinate values of the endpoints for the right line segment and left line segment and a Y increment value which is a value of one if the image is to be rendered in ascending scan line order and is a value of negative one if the image is to rendered in descending scan line order;

a right sub-circuit and left sub-circuit, said right sub-circuit determining a rightmost pixel of the right line segment on a scan line and said left sub-circuit determining the left most pixel of the left line segment on the scan line, said right and left sub-circuits concurrently determining said rightmost and leftmost pixel for a scan line, each of said sub-circuits comprising;

a first subtracter means connected to the receiving means for determining the difference between the Y coordinate value of the endpoints of the line segment and outputing the absolute value of the difference as the ΔY value;

a second subtracter means connected to the receiving means for determining the difference between the X coordinate value of the endpoints of the line segment and outputing the absolute value of the difference as the ΔX value;

major axis determining means connected to the first subtracter and second subtractor for determining the major axis to be the X axis if the ΔX value is greater than or equal to the ΔY value, or the y axis if the ΔY value is greater than the ΔX value;

an error register connected to the first subtracter means, second subtracter means and major axis determining means for storing an error value, said error value initially set to be one-half the Δ value of the major axis;

a Y register for storing a Y coordinate value, an X register for storing an X coordinate value;

a state machine connected to the X register, Y register and error register for controlling the values output from the sub-circuits as the rightmost and leftmost pixel on a scan line, said state machine storing the same initial Y value in the Y registers of the left and right sub-circuits, storing initial X values in the X registers, the initial X values being equal to the X value on each line segment corresponding to the initial Y value, updating the error value stored in the error register to be equal to the difference between Δ value of the major axis and the error value, incrementing the current X value in the X register by the X increment value if the updated error value is greater than zero, and if the updated error value is less than or equal to zero, updating the error value in the error register to be equal to the sum of the error value and corresponding Δ value of the major axis, providing as the output from the subcircuit the current X value, incrementing the current X value by the X increment value and incrementing the current Y value by the Y increment value for determination of the X value to be output with respect to the next scan line located at the incremented Y value;

a circuit output control means connected to the right sub-circuit and left sub-circuit and a means for generating pixel data for the scan line to be output to the frame buffer, said pixel data identifying the pixels to be actuated on the scan line, said circuit output control means controlling the output of the current X value to be delayed until both sub-circuits are ready to output and X value from the circuit, the X value output by the right sub-circuit being the X coordinate location of the rightmost pixel to be actuated on the current scan line and the X value output by the left sub-circuit being the X coordinate location of the leftmost pixel to be actuated on the current scan line;

whereby the coordinate values of the leftmost and rightmost pixels are output simultaneously to the means for generating pixel data which generates the pixel data on the current scan line to be actuated between the rightmost pixel and leftmost pixel and outputs the pixel data immediately to the frame buffer to actuate the pixels identified by the pixel data on the display device.

* * * * *

UNITED STATES PATENT AND TRADEMARK OFFICE
CERTIFICATE OF CORRECTION

PATENT NO. : 5,128,872

DATED : July 7, 1992

INVENTOR(S) : Malachowsky et al.

It is certified that error appears in the above-identified patent and that said Letters Patent is hereby corrected as shown below:

In column 13, claim 1 at line 51, please delete " a adder " and insert -- an adder --.

In column 15, claim 4 at line 18, please delete " absolute " and insert -- absolute value --.

In column 17, claim 5 at line 31, please delete " between " and insert -- between the --.

Signed and Sealed this

Seventh Day of October, 1997

*Attest:*

Bruce Lehman

BRUCE LEHMAN

*Attesting Officer*

*Commissioner of Patents and Trademarks*